(12) United States Patent
Zandonella Necca et al.

(10) Patent No.: US 7,186,173 B2
(45) Date of Patent: Mar. 6, 2007

(54) TOOL PARTICULARLY FOR MILLING OPERATIONS

(75) Inventors: Dino Zandonella Necca, Vicenza (IT); Ferruccio Gonzo, Isola Vicentina (IT)

(73) Assignee: ADI S.p.A., Thiene (IT)

( * ) Notice: Subject to any disclaimer, the term of this patent is extended or adjusted under 35 U.S.C. 154(b) by 0 days.

(21) Appl. No.: 11/045,691

(22) Filed: Jan. 28, 2005

(65) Prior Publication Data

US 2006/0063477 A1   Mar. 23, 2006

(30) Foreign Application Priority Data

Sep. 22, 2004 (IT) .................... PD2004A000232

(51) Int. Cl.
*B24B 33/00* (2006.01)
(52) U.S. Cl. .................... 451/488; 451/547
(58) Field of Classification Search ............. 451/450, 451/449, 488, 542, 543, 51, 49, 547, 358; 15/230.1
See application file for complete search history.

(56) References Cited

U.S. PATENT DOCUMENTS

| 472,493 | A | * | 4/1892 | Brown | 175/425 |
| 3,229,427 | A | * | 1/1966 | Goodhe | 451/415 |
| 3,460,292 | A | * | 8/1969 | Ferchland | 451/124 |
| 4,581,798 | A | | 4/1986 | Yamamoto | |
| 4,765,096 | A | * | 8/1988 | Lang | 451/124 |
| 6,478,021 | B1 | | 11/2002 | Kim et al. | |

FOREIGN PATENT DOCUMENTS

| BE | 639586 | | 11/1963 | |
| DE | 3415498 | | 11/1984 | |
| GB | 2084059 | * | 7/1982 | 451/358 |
| JP | 07276243 | | 10/1995 | |

* cited by examiner

*Primary Examiner*—Jacob K. Ackun, Jr.
(74) *Attorney, Agent, or Firm*—Stradley Ronon Stevens & Young, LLP

(57) ABSTRACT

A tool, particularly for milling operations, capable of being driven in rotation about its own main axis. The tool has a core provided with a plurality of abrasive elements extending from the core radially to the axis and spaced apart from each other angularly. Between at least one pair of abrasive elements adjacent to each other is provided at least one respective gap in the form of a cut extending radially in the core to a predefined distance from the axis.

17 Claims, 1 Drawing Sheet

TOOL PARTICULARLY FOR MILLING OPERATIONS

TECHNICAL FIELD

The present invention relates generally to a tool and, more particularly, to a milling tool capable of being driven in rotation about its own main axis.

BACKGROUND OF THE INVENTION

In this particular technical area, there are known milling tools that have a core. Sectors of abrasive material are provided on the core, typically arranged at a regular angular pitch around the core. When such tools are used, the heat produced in the milling operation as a result of the contact between the abrasive sectors and the surfaces of the work piece must be dissipated adequately. Typically, heat dissipation is achieved by conveying cooling fluids to the areas being machined.

According to a known solution, the core of the tool is provided with a plurality of holes extending radially from the outer casing of the core in the direction of its main axis and also positioned in the portions of the core located between pairs of abrasive elements adjacent to each other. With these holes so configured, the cooling fluid is delivered from the inside of the core into the length occupied by the abrasive elements so as to enhance the cooling effect.

The conventional solution has some limitations, however, due mainly to the fact that the presence of the holes in the core creates structural discontinuities in the core. Such discontinuities generate localized increases in the state of stress induced in the tool by machining forces. These stresses may compromise the tool structurally, typically generating fatigue fractures. Moreover, the presence of a plurality of holes for the cooling fluid to pass through introduces a discontinuity in the cooling of the tool along the core, this being greatest at the holes but characterized by thermal gradients in the areas between adjacent holes.

SUMMARY OF THE INVENTION

The problem addressed by the present invention is that of providing a tool, particularly for milling operations, designed structurally and operationally to overcome the undesirable limitations noted above with reference to the known technology.

To solve this and other problems, and in view of its purposes, the present invention provides a tool, particularly for milling operations, capable of being driven in rotation about its own main axis. The tool has a core provided with a plurality of abrasive elements extending from the core radially to the axis and spaced apart from each other angularly. Located between at least one pair of abrasive elements adjacent to each other is at least one respective gap in the form of a cut extending radially in the core to a predefined distance from the axis.

It is to be understood that both the foregoing general description and the following detailed description are exemplary, but are not restrictive, of the invention.

BRIEF DESCRIPTION OF THE DRAWING

Other characteristics and advantages of the invention will become clear from the following detailed description of a preferred embodiment illustrated purely by way of non-limiting example with reference to the appended drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
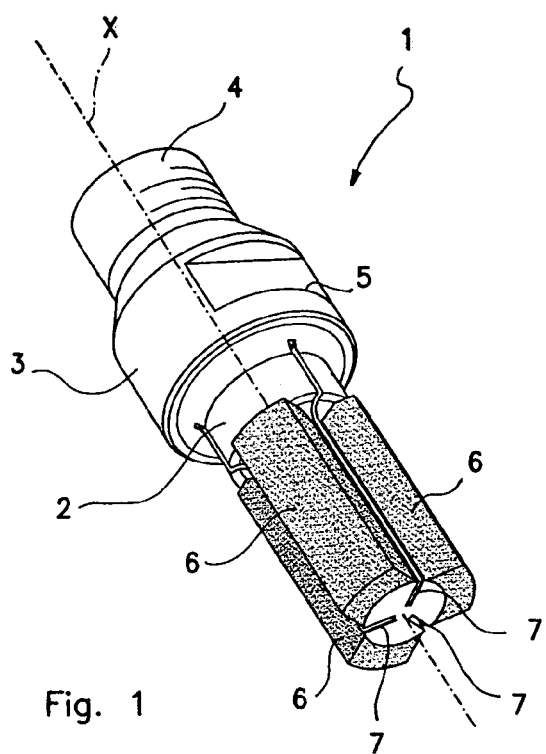
FIG. 1 is a perspective view of a tool produced according to the invention.
Figure 3:
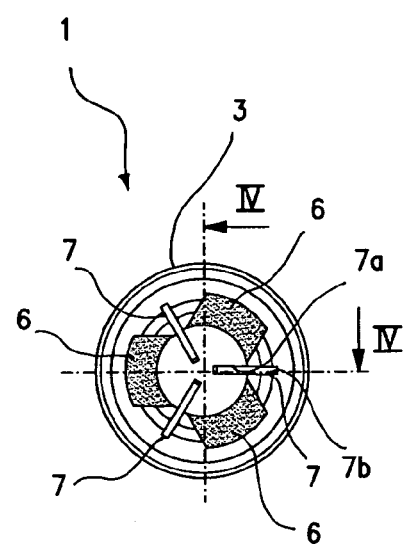
FIG. 3 is a view in front elevation of the tool in the preceding figures.

Referring now to the drawing, in which like reference numbers refer to like elements throughout the various figures that comprise the drawing, FIG. 1 shows as a whole a tool 1 for milling operations produced according to the invention.

The tool 1 is arranged to be driven in rotation about its main axis, indicated by X in the drawing, and has a cylindrical core 2 extending coaxially with this axis. The core 2 is continued, at the end axially opposite its free end 2a, to form a shank 3, having a diameter greater than the core 2, arranged for fitting the tool 1 to a tool holder (not shown). For this purpose, the shank 3 is in turn continued to form an externally threaded cylindrical pin 4, arranged to be fitted by screwing into the tool holder. A flat surface 5 is obtained by producing flats on part of the casing of the core 2; the flat surface 5 is used to lock the tool 1 torsionally in the relevant tool holder.

The core 2 is also provided with a plurality of abrasive elements 6 (set with diamond particles, for example). The abrasive elements 6 are fixed to the core 2 by, for example, bonding, brazing, or another form of mechanical attachment. The abrasive elements 6 extend from the core 2 radially to the axis X and are spaced apart from each other angularly at a regular pitch.

Figure 2:
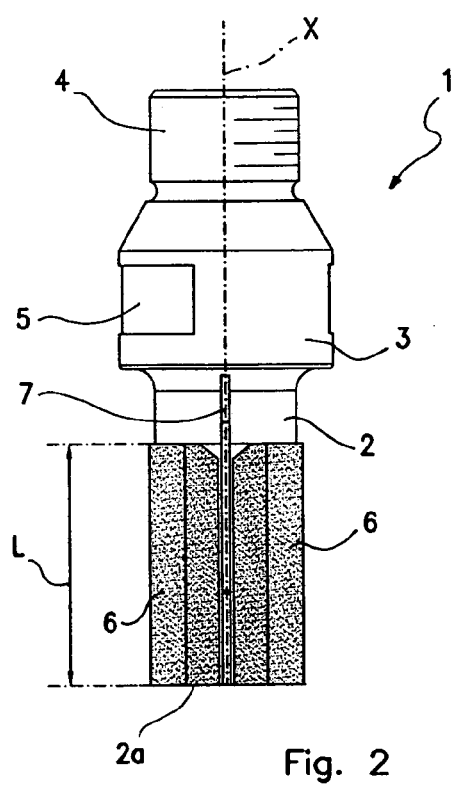
FIG. 2 is a view in side elevation of the tool in FIG. 1.

More particularly, three abrasive elements 6 are provided, spaced apart angularly at a pitch of 120° about the axis X. The three abrasive elements 6 have respective cross-sections shaped as portions of an annular sector extending radially from the cylindrical casing of the core 2, as shown clearly in FIG. 2. Each respective abrasive element 6 also extends axially, along the axis X, for the greater part of the longitudinal extent L of the core 2, from the end 2a of the core 2.

According to a principal characteristic of the invention, a gap 7 in the form of a cut is provided between each pair of adjacent abrasive elements 6. The gap 7 extends radially in the core 2 to a predefined distance from the axis X. As can be seen from FIG. 2, each pair of adjacent abrasive elements 6 is arranged in a symmetrical position relative to a centrally positioned plane which identifies the corresponding gap 7 formed between these, in such a way that the gaps 7 are therefore arranged, transversely to the axis X, at 120° from each other, in a centered configuration relative to the arrangement of the abrasive elements 6.

Preferably each gap 7 in the form of a cut is open in the outer casing of the core 2 to extend radially to a predefined and common distance from the axis X. The term "predefined," as applied to the distance, means that the distance must be defined, i.e., chosen or at least known, before the gap 7 is formed. Each gap 7 also extends axially for the entire longitudinal extent L of the core 2, from the end 2a, until it ends in the vicinity of the shoulder surface formed between the core 2 and the shank 3.

Each gap 7 is also identified by a pair of flat surfaces 7a, 7b, parallel and facing each other a short distance apart, which are joined at the bottom of the corresponding gap 7. This distance, the radial depth, and the longitudinal position of the gap 7 are selected so as to provide a passage inside the gap 7 for cooling fluid capable of forming a continuous and homogeneous layer of fluid to coat the part of the abrasive elements 6 in contact with the work piece.

Figure 4:
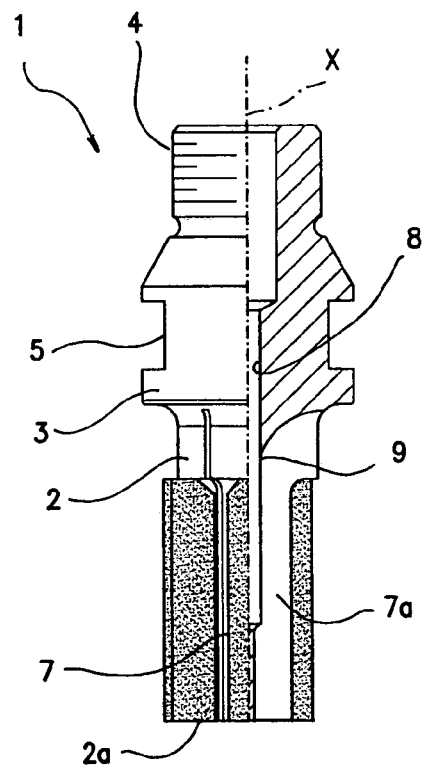
FIG. 4 is a view of the tool disclosed by the invention in side elevation and partly in section along the lines IV—IV in FIG. 3.

An axial hole 8 is made in the tool 1, coaxially with the axis X and extending from the end 2a to a predefined distance from the opposite axial end. As shown in FIG. 4, the hole 8 is in fluid communication with each of the gaps 7 at a respective section 9 forming a through passage. Each of the sections 9 is formed by the intersection of the hole 8 with the corresponding gap 7 and its longitudinal extension may be predefined according to the axial depth selected for the hole 8 in the core 2. The value assigned to this extension controls the amount of fluid that is conveyed to the gaps 7 through the axial hole 8 during mechanical machining operations performed using the tool, depending on the specific requirements. In any case, the fluid fed through each section 9 is delivered in the form of a fluid layer to coat the corresponding abrasive element 6 over its entire longitudinal extension, independently of the size chosen for the section 9 forming a through passage.

It should be noted how easily each of the gaps 7 in the form of a cut in the core 2 can be produced, in particular with a single cutting operation on the core 2. This feature compares favorably with the greater complexity of known solutions, which provide for multiple drilling of the core. This advantageously allows an appreciable reduction in the manufacturing times for the tool 1.

A further advantage lies in the fact that the provision of the gaps 7 in the form of a cut in the tool 1 according to the invention entails a reduction in the stress concentrations in areas in which the highest loads are applied to the tool 1. In contrast, known solutions provide a plurality of holes with consequent generation of stress peaks at each individual hole.

The provision of such gaps 7 in the form of a cut and consequently the generation of continuous layers of cooling fluid also advantageously enable a cooling effect to be obtained with no break in continuity along the core 2, compared with the discontinuous cooling effect obtainable with the multiple hole configurations provided by the known technology.

The invention thus solves the problem stated and secures the advantages referred to above compared with known solutions.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A tool for milling operations on a work piece having surfaces, the tool capable of being driven in rotation about a main axis and comprising a core having (i) a plurality of abrasive elements extending from the core radially to the axis and spaced apart from each other angularly; (ii) at least one respective gap in the form of a cut between at least one pair of abrasive elements adjacent to each other, the gap extending radially in the core to a predefined distance from the axis; (iii) an outer casing with the at least one gap in the form of a cut open at the outer casing of the core along a substantial length of the at least one pair of abrasive elements; (iv) a hole coaxial with the axis and extending to a predefined distance from the axial end of the core occupied by the abrasive elements, and in which the at least one gap in the form of a cut is in fluid communication with the hole in the core: and (v) a section, radially extending directly in the core between the hole and the at least one gap in the form of a cut, through which cooling fluid passes to convey the cooling fluid fed through the hole over the abrasive elements at the surfaces of the work piece.

2. The tool according to claim 1, in which the at least one gap in the form of a cut extends axially in the core along at least part of the axial length of the core provided with the abrasive elements.

3. The tool according to claim 1, the tool having a respective gap in the form of a cut between each pair of abrasive elements adjacent to each other, each of the gaps in the form of a cut extending radially in the core to a predefined distance from the axis and axially for at least a length of the core provided with the abrasive elements.

4. The tool according to claim 3, in which the gaps in the form of a cut are open at the outer casing of the core.

5. The tool according to claim 1, in which the section forming a through passage has a longitudinal extension along the axis, the longitudinal extension adapted to be altered according to the axial depth of the hole in the core.

6. The tool, according to claim 3, in which each of the gaps in the form of a cut is bounded by a pair of flat surfaces, parallel and facing each other a short distance apart.

7. The tool according to claim 3, in which there are three respective gaps in the form of a cut arranged in the core at a regular angular pitch of 120°.

8. The tool according to claim 1, in which the abrasive elements include portions of annular sectors of abrasive material fixed to the outer casing of the core.

9. The tool according to claim 1, further comprising means for attaching the tool to a tool holder.

10. A tool, for milling operations on a work piece having surfaces, the tool capable of being driven in rotation about a main axis and comprising a core having (i) a plurality of abrasive elements extending from the core radially to the axis and spaced apart from each other angularly; (ii) a respective gap in the form of a cut between each pair of abrasive elements adjacent to each other, each of the gaps in the form of a cut extending radially in the core to a predefined distance from the axis and axially for at least a length of the core provided with the abrasive elements; (iii) an outer casing with the gaps in the form of a cut open at the outer casing of the core; (iv) a hole coaxial with the axis and extending to a predefined distance from the axial end of the core occupied by the abrasive elements, and in which each gap in the form of a cut is in fluid communication with the hole in the core: and (v) a section, radially extending directly in the core between the hole and each corresponding gap in the form of a cut, through which cooling fluid passes to convey the cooling fluid fed through the hole over the abrasive elements at the surfaces of the work piece.

11. The tool according to claim 10, in which each section forming a through passage has a longitudinal extension along the axis, the longitudinal extension adapted to be altered according to the axial depth of the hole in the core.

12. The tool according to claim 10, in which each of the gaps in the form of a cut is bounded by a pair of flat surfaces, parallel and facing each other a short distance apart.

13. The tool according to claim 10, in which there are three respective gaps in the form of a cut arranged in the core at a regular angular pitch of 120°.

14. The tool according to claim 10, in which the abrasive elements include portions of annular sectors of abrasive material fixed to the outer casing of the core.

15. The tool according to claim 10, further comprising means for attaching the tool to a tool holder.

16. The tool according to claim 15, in which the attaching means includes a threaded cylindrical pin adapted to be fitted by screwing into the tool holder and a flat surface on part of the casing of the core adapted to lock the tool torsionally in the tool holder.

17. A tool, for milling operations on a work piece having surfaces, the tool capable of being driven in rotation about a main axis and comprising:

a core having (i) a plurality of abrasive elements extending from the core radially to the axis and spaced apart from each other angularly, the abrasive elements defining portions of annular sectors of abrasive material; (ii) a respective gap in the form of a cut bounded by a pair of flat surfaces, parallel and facing each other a short distance apart, between each pair of abrasive elements adjacent to each other, each of the gaps in the form of a cut extending radially in the core to a predefined distance from the axis and axially for at least a length of the core provided with the abrasive elements; (iii) an outer casing with the gaps in the form of a cut open at the outer casing and the portions of annular sectors of abrasive material fixed to the outer casing of the core; and (iv) a hole coaxial with the axis and extending to a predefined distance from the axial end of the core occupied by the abrasive elements, and in which each gap in the form of a cut is in fluid communication with the hole in the core;

a section, between the hole and each corresponding gap in the form of a cut, through which cooling fluid passes to convey the cooling fluid fed through the hole over the abrasive elements at the surfaces of the work piece, with each section forming a through passage having a longitudinal extension along the axis adapted to be altered according to the axial depth of the hole in the core; and means for attaching the tool to a tool holder.

\* \* \* \* \*